United States Patent
Zhu et al.

(10) Patent No.: US 12,294,294 B2
(45) Date of Patent: May 6, 2025

(54) INTEGRATED ON-BOARD CHARGER AND AUXILIARY POWER MODULE USING A TRIPLE ACTIVE BRIDGE FOR ELECTRIC VEHICLES

(71) Applicants: Hella Corporate Center USA, Inc., Northville, MI (US); University of Tennessee Research Foundation, Knoxville, TN (US)

(72) Inventors: Liyan Zhu, Knoxville, TN (US); Alan W. Brown, Canton, MI (US); Hua Bai, Knoxville, TN (US); Lukas Michael Keuck, Paderborn (DE)

(73) Assignees: Hella Corporate Center USA, Inc., Northville, MI (US); University of Tennessee Research Foundation, Knoxville, TN (US)

( * ) Notice: Subject to any disclaimer, the term of this patent is extended or adjusted under 35 U.S.C. 154(b) by 234 days.

(21) Appl. No.: 17/928,006

(22) PCT Filed: May 25, 2021

(86) PCT No.: PCT/US2021/033986
§ 371 (c)(1),
(2) Date: Nov. 28, 2022

(87) PCT Pub. No.: WO2021/247278
PCT Pub. Date: Dec. 9, 2021

(65) Prior Publication Data
US 2023/0223840 A1    Jul. 13, 2023

Related U.S. Application Data

(60) Provisional application No. 63/033,246, filed on Jun. 2, 2020.

(51) Int. Cl.
*H02M 3/335* (2006.01)
*B60L 1/00* (2006.01)
(Continued)

(52) U.S. Cl.
CPC .............. *H02M 1/4208* (2013.01); *B60L 1/00* (2013.01); *B60L 53/22* (2019.02); *B60L 58/20* (2019.02);
(Continued)

(58) Field of Classification Search
CPC ........ H02M 1/10; H02M 1/42; H02M 1/4216; H02M 1/4233; H02M 1/4208; H02M 7/21;
(Continued)

(56) References Cited

U.S. PATENT DOCUMENTS 8,891,254 B2 * 11/2014 Kominami ........ H02M 3/33584
363/17
11,368,037 B2 * 6/2022 Jimenez Pino ... H02M 3/33576
(Continued)

FOREIGN PATENT DOCUMENTS

| WO | 2015164970 A1 | 11/2015 |
|---|---|---|
| WO | 2019020254 A1 | 1/2019 |
| WO | 2019199964 A1 | 10/2019 |

OTHER PUBLICATIONS

Zhiqiang Guo; Kai Sun; Tsai-Fu Wu; Canbing Li; "An Improved Modulation Scheme of Current-Fed Bidirectional DC-DC Converters For Loss Reduction"; Jun. 26, 2017; IEEE; IEEE Transactions on Power Electronics; pp. 4441-4457 (Year: 2017).*
(Continued)

*Primary Examiner* — Thienvu V Tran
*Assistant Examiner* — Shahzeb K Ahmad
(74) *Attorney, Agent, or Firm* — WARNER NORCROSS + JUDD LLP (57) ABSTRACT

A power conversion system including a triple active bridge (TAB) is provided. The system includes a power factor
(Continued)

correction (PFC) module and a three port converter (TPC) module, with no post-regulation or additional stages required. The TPC module includes an OBC full-bridge and an APM full-bridge, each being inductively coupled to the output of the PFC full-bridge, thereby forming the TAB. The OBC full-bridge is adapted to convert an AC input into a high-voltage DC output for a high-voltage battery, and the APM full-bridge is adapted to convert an AC input into a low-voltage DC output for a low-voltage battery. The power conversion system can accept a single-phase AC input and a three-phase AC input, has a lower current stress as compared to prior art TPCs, and freely transfers power from among any ports.

16 Claims, 8 Drawing Sheets

(51) Int. Cl.
| | | |
|---|---|---|
| *B60L 53/22* | (2019.01) | |
| *B60L 58/20* | (2019.01) | |
| *H02M 1/42* | (2007.01) | |
| *H02M 7/00* | (2006.01) | |
| *H02M 7/219* | (2006.01) | |
| *H02M 7/86* | (2006.01) | |
| *H02M 1/10* | (2006.01) | |

(52) U.S. Cl.
CPC ....... *H02M 3/33561* (2013.01); *H02M 7/003* (2013.01); *H02M 7/219* (2013.01); *H02M 7/86* (2013.01); *B60L 2210/10* (2013.01); *B60L 2240/527* (2013.01); *B60L 2240/529* (2013.01); *B60L 2270/147* (2013.01); *H02M 1/10* (2013.01); *H02M 1/4216* (2013.01); *H02M 1/4233* (2013.01); *H02M 3/33573* (2021.05); *H02M 3/33584* (2013.01)

(58) Field of Classification Search
CPC .. H02M 7/219; H02M 7/2133; H02M 7/2176; H02M 7/2195; H02M 7/483; H02M 7/4833; H02M 7/4835; H02M 7/4837; H02M 7/66; H02M 7/68; H02M 7/757; H02M 7/77; H02M 7/797; H02M 7/86; H02M 3/33561; H02M 3/33573; B60L 2210/10; B60L 2240/527; B60L 2240/529; B60L 2270/147; B60L 53/22; B60L 58/20; B60L 1/00
See application file for complete search history.

(56) References Cited

U.S. PATENT DOCUMENTS

| | | | |
|---|---|---|---|
| 2006/0170371 A1 | 8/2006 | Lyle et al. | |
| 2014/0103860 A1* | 4/2014 | Kominami | B60L 1/003 320/108 |
| 2016/0016479 A1 | 1/2016 | Khaligh et al. | |
| 2016/0236580 A1* | 8/2016 | Hou | B60L 58/20 |
| 2018/0222333 A1* | 8/2018 | Khaligh | H02M 1/4258 |
| 2021/0143665 A1* | 5/2021 | Jimenez Pino | H02M 7/06 |
| 2021/0155100 A1* | 5/2021 | Khaligh | B60L 55/00 |
| 2021/0249965 A1* | 8/2021 | Ojika | H02M 7/06 |
| 2021/0273571 A1* | 9/2021 | Chen | H02M 1/0058 |

OTHER PUBLICATIONS

Shashank Kurm; Vivek Agarwal; "Novel Dual Active Bridge Based Multi Port Converter for Interfacing Hybrid Energy Storage Systems in Electric Vehicles"; Apr. 30, 2020; IEEE; 2019 IEEE Transportation Electrification Conference (ITEC-India); pp. 1-5 (Year: 2020).*

International Search Report and Written Opinion of the International Searching Authority for PCT/US2021/033986 dated Sep. 10, 2021, 8 pages.

* cited by examiner

INTEGRATED ON-BOARD CHARGER AND AUXILIARY POWER MODULE USING A TRIPLE ACTIVE BRIDGE FOR ELECTRIC VEHICLES

CROSS-REFERENCE TO RELATED APPLICATIONS

This application claims the benefit of U.S. Provisional Application 63/033,246, filed Jun. 2, 2020, the disclosure of which is incorporated by reference in its entirety.

FIELD OF THE INVENTION

The present invention relates to on-board charging systems for electric vehicles, and in particular, on-board charging systems for high voltage loads and low voltage loads.

BACKGROUND OF THE INVENTION

Power electronics are an integral aspect of the modern electric vehicle (EV). Power electronics transform energy from a power source into different forms for various electrical loads. For example, an on-board charger (OBC) accepts an AC input and converts the AC input into a high voltage DC output (e.g., 400V) to charge a propulsion battery. Also by example, an auxiliary power module (APM) steps down the high voltage DC bus voltage to a low voltage DC bus (e.g., 12V) to power non-propulsion loads and to charge the low voltage battery. The OBC and the APM are typically separate units, yielding high cost, large size, and redundant components.

Figure 1:
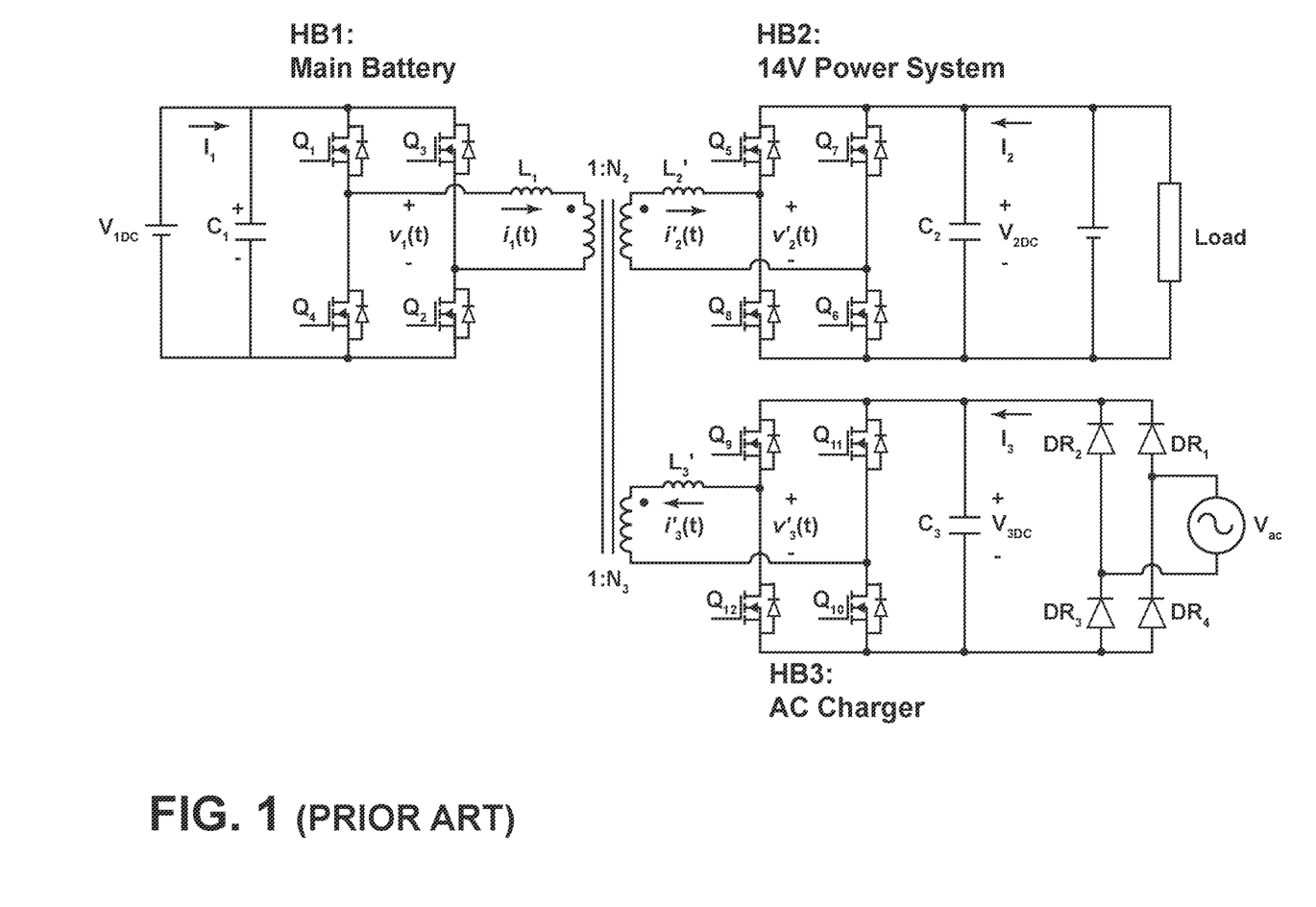
FIG. 1 is a circuit diagram of a prior art phase-shifted three port converter, in which output power flow is controlled by the phase difference of each port.

Various efforts have been made to integrate OBCs with APMs so that they share the same cooling system. For example, Phase Shifted Three Port Converters (PS-TPCs) generate three alternative voltages with a certain phase angle. The power flow is controlled by the phase difference of each port. The base operation is similar to the power flow control of the power grid, though the detailed topologies may vary, such as in FIG. 1 (see, e.g., S. Y. Kim, I. Jeong, K. Nam, and H. S. Song, "Three-port full bridge converter application as a combined charger for PHEVs," in 5th IEEE Vehicle Power and Propulsion Conference, VPPC '09, 2009, pp. 461-465). The main challenge lies on the high current stress. If any two ports have an unmatched voltage, e.g., $V_{1DC}:V_{2DC}=1:N_2$, the switch current stress will increase sharply.

Figure 2:
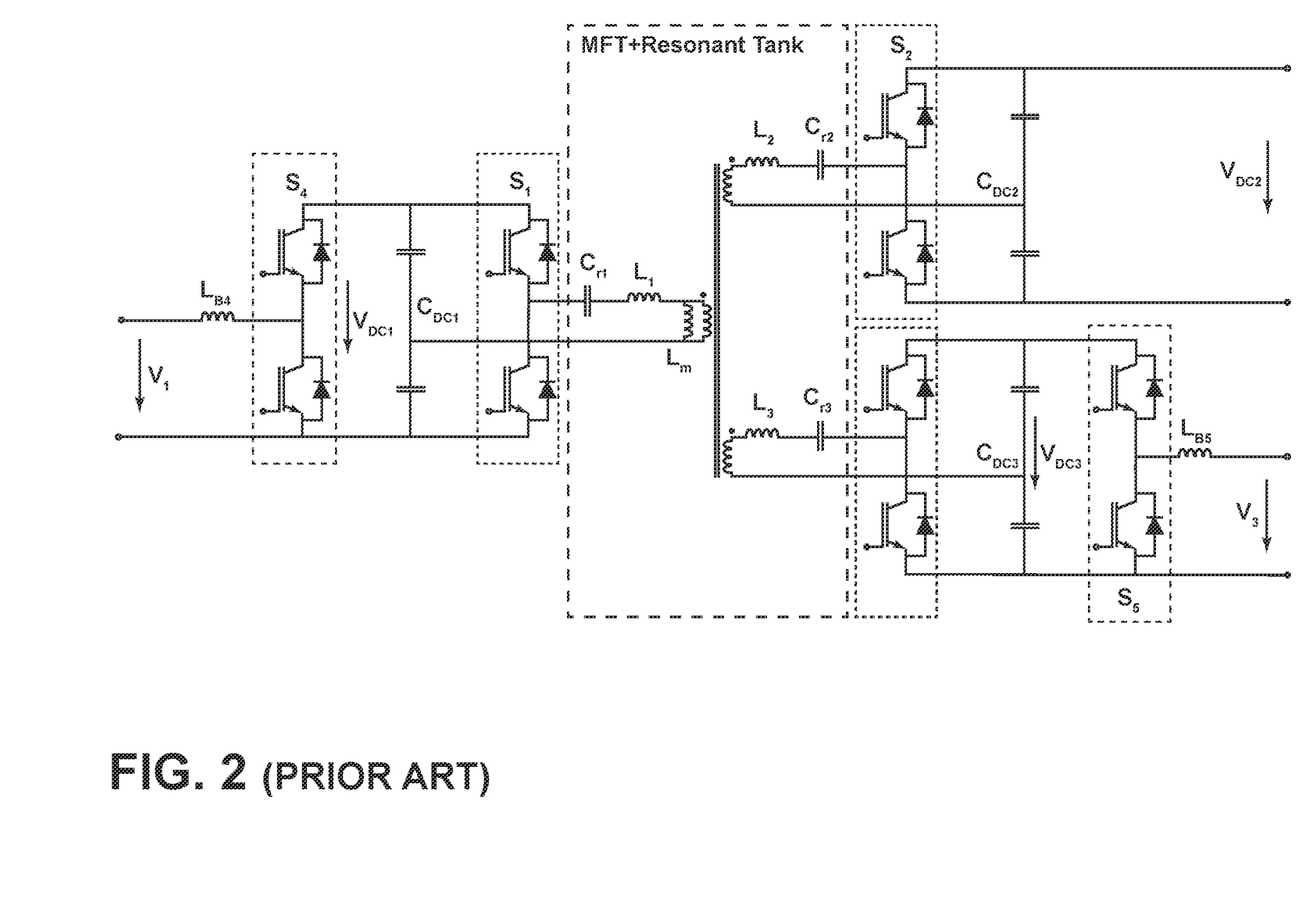
FIG. 2 is a circuit diagram of a prior art two stage resonant three port converter with an additional stage at two of the three ports to regulate the output power flow.

To adapt for EV applications, new control freedoms have also been introduced. Post regulation is one solution to introduce such new control freedoms. As shown in FIG. 2, an additional stage was added at two ports to regulate the output power flow (see, e.g., Y. K. Tran and D. Dujic, "A multiport isolated DC-DC converter," in Conference Proceedings—IEEE Applied Power Electronics Conference and Exposition—APEC, 2016, vol. 2016-May, pp. 156-162; Y. K. Tran and D. Dujic, "A multiport medium voltage isolated DC-DC converter," in IECON Proceedings, 2016, pp. 6983-6988; Y. K. Tran, F. D. Freijedo, and D. Dujic, "Multiport energy gateway," IET Electr. Power Appl., vol. 13, no. 10, pp. 1524-1534, October 2019). Due to the wide duty-cycle range of the buck, this post-regulation type has a good voltage gain. In addition, the three port LLC is always at resonance, yielding high efficiency, though the current stresses are now shifted to the buck stage. In addition, this multi-stage design yields a high cost.

Accordingly, there remains a continued need for a low-cost power conversion system including an integrated OBC and APM to convert an AC input into two DC outputs for various electric vehicle loads, including propulsion loads and non-propulsion loads.

SUMMARY OF THE INVENTION

A power conversion system including a triple active bridge (TAB) is provided. The power conversion system includes a power factor correction (PFC) module and a three port converter (TPC) module, with no post-regulation or additional stages required. The PFC module provides rectification and power factor correction, and the TPC module includes an integrated OBC and an APM, each being inductively coupled to the output of the PFC module via a three-winding transformer. The OBC and the APM are physically integrated into a common housing. The power conversion system is able to accommodate both single-phase and three-phase AC inputs, and includes minimal parts with low current stresses, thereby achieving low cost and high efficiency. The power conversion system is bidirectional and is able to freely transfer power from among any ports, which is a significant shortcoming in prior art systems. The current embodiment is also able to accommodate 400V and 800V battery scenarios with a single design.

In one embodiment, the PFC module includes a power factor correction rectifier. The power factor correction rectifier is adapted to convert a single-phase AC or a three-phase AC into a DC-bus voltage for a primary-side full bridge of the TPC module. The primary-side full bridge is inductively coupled to the OBC and the APM via the three-winding transformer, such that the first winding is electrically connected to the primary-side voltage-fed full bridge, the second winding is electrically connected to an OBC current-fed full-bridge, and the third winding is electrically connected to an APM current-fed full-bridge. The OBC full-bridge is adapted to convert an AC output of the second winding into a first DC voltage for a high-voltage battery, and the APM full-bridge is adapted to convert an AC output of the third winding into a second DC voltage for a low-voltage battery, the first DC voltage being greater than the second DC voltage.

In another embodiment, the OBC includes a switch for alternating the high voltage port between a current fed, high voltage output and a voltage fed, low voltage output. Similarly, the APM includes a switch for alternating the low voltage port between a current fed, high voltage output and a voltage fed, low voltage output. The APM can alternatively include an additional output port, for example a voltage-fed output that is parallel connected to the APM full-bridge, in combination with the existing current-fed, low voltage output port. In this configuration, the present invention can be used as an on-board charger or an off-board charger for meeting different power demands, depending on the battery load.

In these and other embodiments, the TPC module includes a dual output DC-DC converter that is able to simultaneously charge a high-voltage battery and a low-voltage battery. The TPC module can be also configured as bidirectional to realize energy flow freely among all ports at the same time with minimum current stress. These and other features and advantages of the present invention will become apparent from the following description of the invention, when viewed in accordance with the accompanying drawings and the appended claim.

DETAILED DESCRIPTION OF THE CURRENT EMBODIMENT

Figure 3:
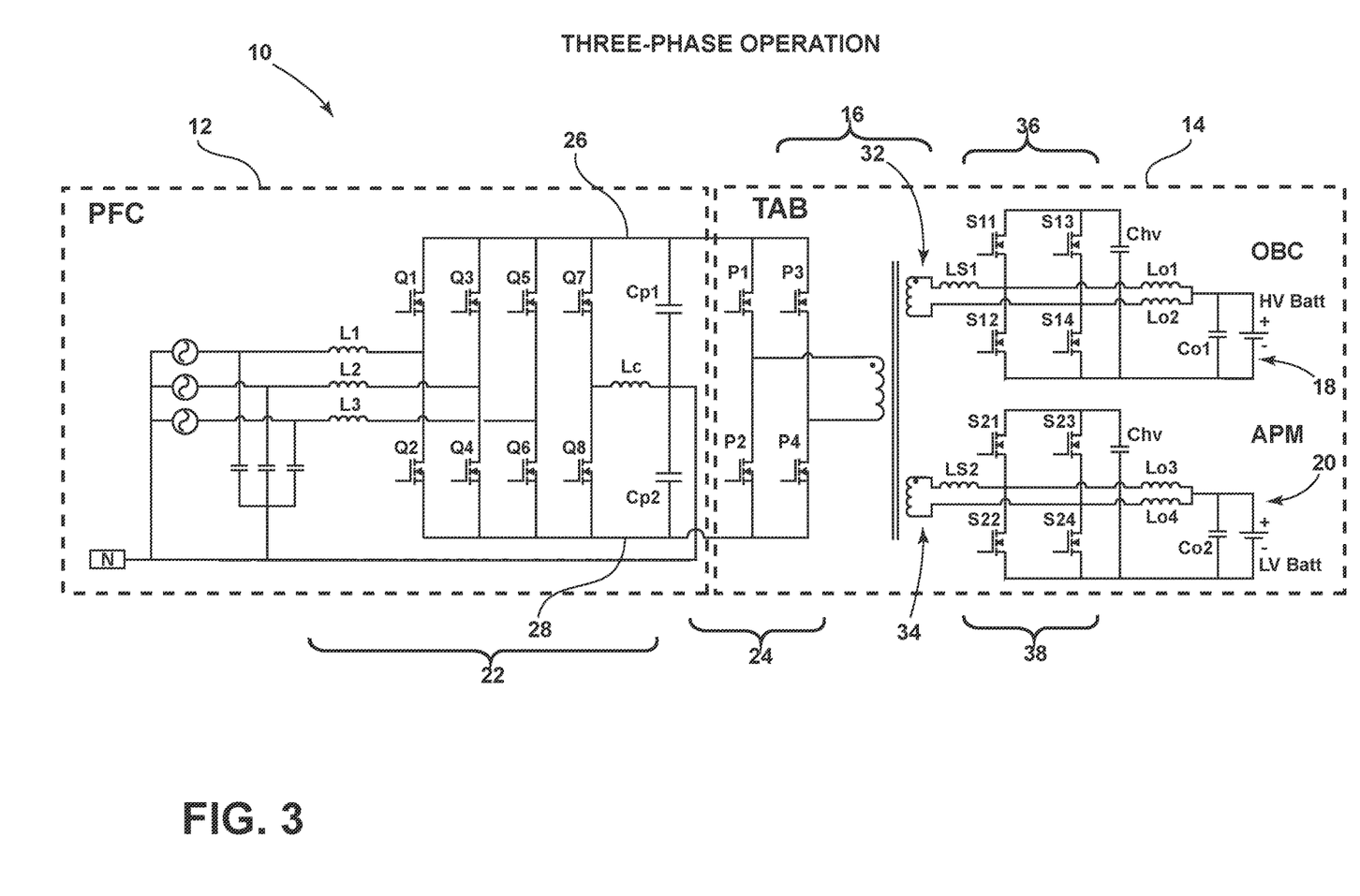
FIG. 3 is a circuit diagram of a power conversion system for converting a three-phase AC input into respective first and second DC output for a high-voltage battery and a low-voltage battery in accordance with one embodiment of the present invention.
Figure 4:
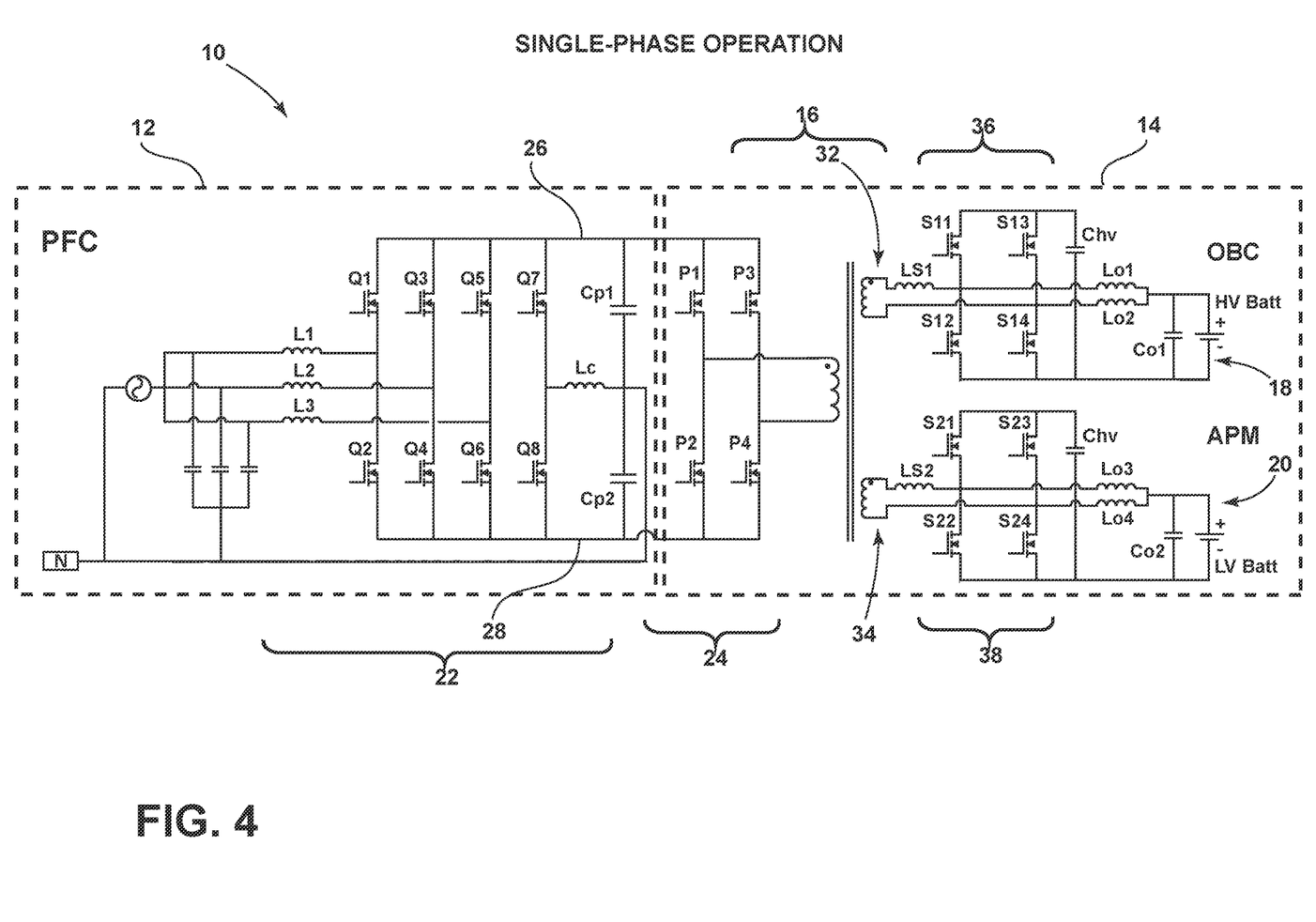
FIG. 4 is a circuit diagram of a system for converting a single-phase AC input into respective first and second DC output for a high-voltage battery and a low-voltage battery in accordance with one embodiment of the present invention.

As discussed herein, the power conversion system of the present invention includes an integrated on-board charger (OBC) and auxiliary power module (APM) (i.e., the OBC and APM are physically integrated into the same housing) using a triple-active-bridge (TAB). To provide the TAB, and as shown in FIGS. 3-4, the power conversion system 10 includes a power factor correction (PFC) module 12 and a three port converter (TPC) module 14 having a three-winding transformer 16. The PFC module 12 provides rectification and power factor correction for single-phase and three-phase operation, and the TPC module 14 converts the DC output of the PFC module 12 into a high-voltage DC output for a high-voltage battery 18 and a low-voltage DC output for a low voltage battery 20.

More specifically, the PFC module 12 provides rectification and power factor correction and for a single-phase AC input and a three-phase AC input. As shown in FIGS. 3-4, the PFC module 12 includes a PFC rectifier 22. The PFC rectifier 22 includes a six-switch boost converter topology for rectification and power factor correction, but can include other topologies in other embodiments. Filter capacitors formed by series connected Cp1 and Cp2 are parallel connected between the PFC rectifier 22 and the primary side full-bridge 24 to filter and smooth out the DC-bus voltage in the DC bus rails 26, 28. In three-phase operation as shown in FIG. 3, the PFC rectifier 22 converts each phase of a three-phase AC input into a DC current. In single-phase operation as shown in FIG. 4, the first three legs (Q1-Q6) of the PFC rectifier 22 form an interleaved circuit, and the last leg (Q7-Q8) is reconfigured to carry the neutral current. To overcome the $2^{nd}$ harmonics on the DC-bus voltage (across filter capacitors Cp1 and Cp2), the PFC module 12 includes a small linking capacitance, thereby yielding high oscillation on the DC-bus voltage.

Figure 5:
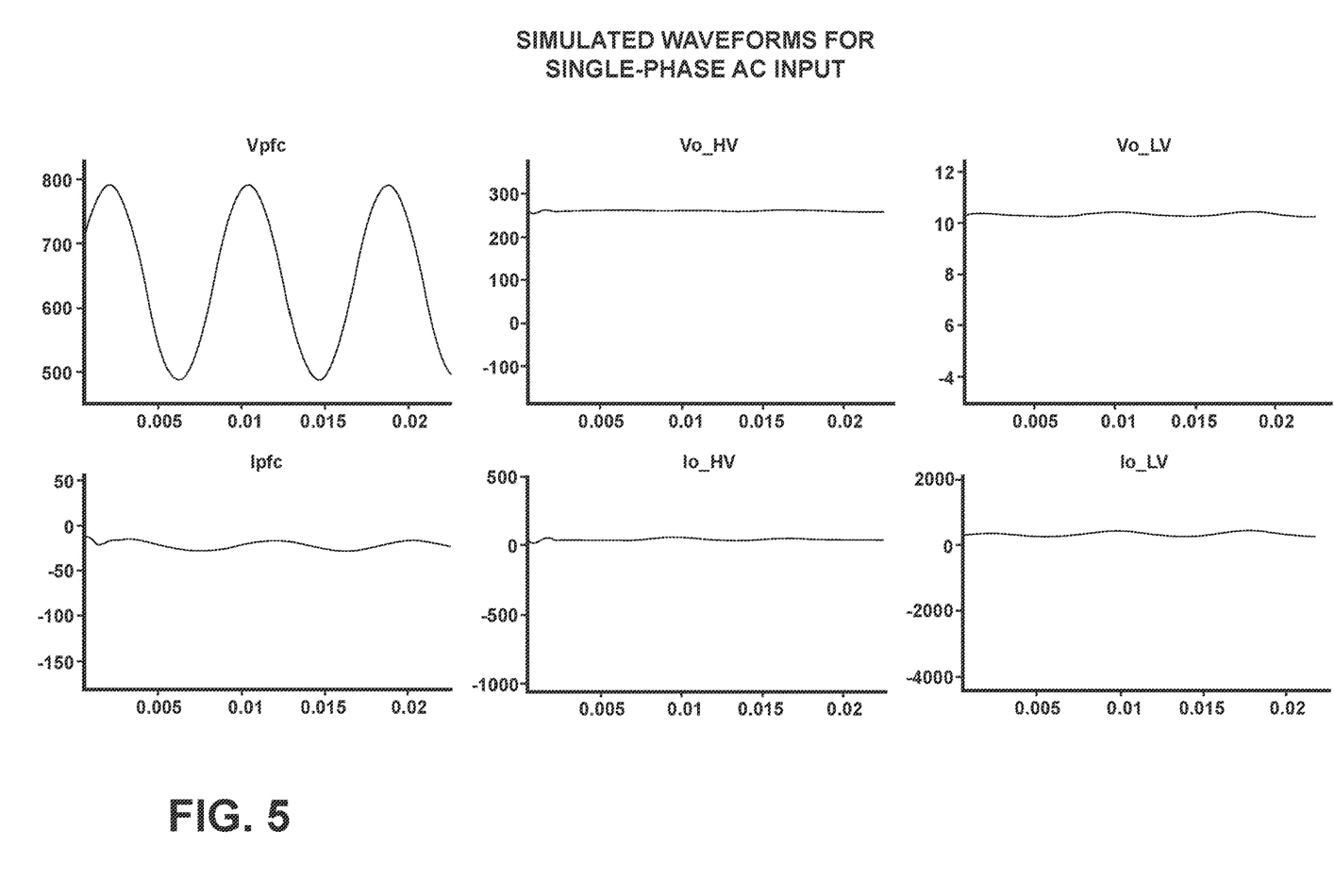
FIG. 5 includes simulated waveforms for a single-phase AC input, achieving an approximately 250 VDC high-voltage output and 10 VDC low-voltage output.

As also shown in FIGS. 3-4, the TPC module 14 includes a three-winding transformer 16 with a first winding 30, a second winding 32, and a third winding 34. The three-winding transformer 16 couples the AC output of the primary-side full-bridge 24 with the AC input of the OBC current-fed full-bridge 36 and the AC input of the APM current-fed full-bridge 38. The OBC is connected to the second transformer winding 32 and includes a resonant inductor (LS1) and a full-bridge 36. The APM is electrically connected to the third transformer winding 34 and also includes a resonant inductor (LS2) and a full-bridge 38. At the voltage-fed primary side of the three-winding transformer, the TPC module 14 includes the above-discussed voltage-fed full-bridge topology 24, such that the voltage-fed full-bridge 24, the OBC current-fed full-bridge 36, and the APM current-fed full-bridge 38 form a triple active bridge. The high-voltage portion of the TPC module 14 (OBC) is therefore coupled to the high-voltage battery 18, which supplies power to the propulsion system, while the low-voltage portion of the TPC module 14 (APM) is coupled to the low voltage battery 20, which supplies low-voltage power to auxiliary loads. For example, FIG. 5 includes simulated waveforms for a single-phase AC input, achieving an approximately 250 VDC high-voltage output and 10 VDC low-voltage output.

Figure 6:
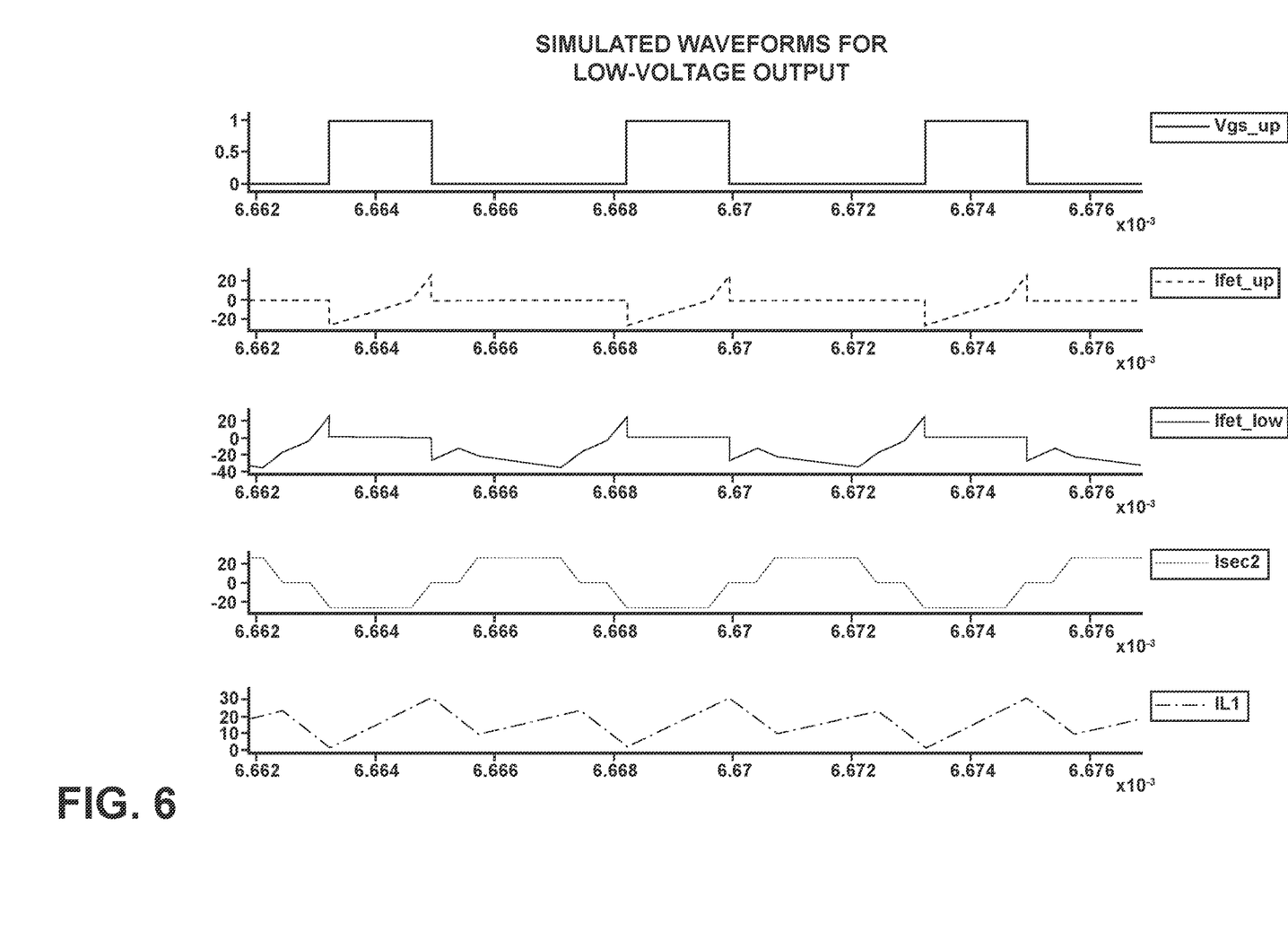
FIG. 6 includes simulated waveforms for the low-voltage full-bridge for the power conversion system of the present invention.

As noted above, the PFC module 12 includes a PFC rectifier 22 that provides a regulated voltage to the primary-side full-bridge 24, while the OBC full-bridge 36 is current fed and the APM full-bridge 38 is current fed. To provide a regulated DC-bus voltage, a controller provides open loop, feedforward control of switches Q1-Q8 as a voltage-source inverter. When assigning the appropriate duty cycle to the APM full-bridge 38 on the secondary side, the ratio of the PFC-side DC-bus voltage over $V_{Chv}$ and $V_{Clv}$ can be made equal to the related transformer turn ratio. For example, if the transformer turn ratio is 20:20:1 and the primary side PFC DC-bus voltage is 800V and the low voltage battery 20 is only 10V, the duty cycle of S22 and S24 can be 75%, thereby boosting $V_{Clv}$ to 40V thereby still securing transformer terminal voltage ratio equal to the turn ratio. Simulated waveforms of the low-voltage full-bridge are shown in FIG. 6 for example, with Vo being 10 V. As a result, the transformer current can be flat without increasing sharply as with traditional DAB circuits.

As also shown in FIGS. 3-4, the TPC module 14 includes a low-pass filter comprising first and second inductors Lo1, Lo2 and a filter capacitor Co1, Co2 connected between the on-board charger full bridge 36 and a first output port for the high voltage battery 18. The TPC module 14 also includes a low-pass filter comprising smoothing inductors Lo3, Lo4 and a filter capacitor connected between the auxiliary power module full bridge 38 and a second output port for the low voltage battery 20. The inductors Lo1, Lo2 are coupled to between a branch of the respective full bridge 36, 38 and the respective output port, and the inductors Lo1, Lo2 boost the voltage at the corresponding clamping capacitor Chv, Clv, providing the same power output but at a lower voltage. The high voltage clamping capacitor Chv is parallel-connected to the on-board charger full bridge 36, and the low voltage clamping capacitor Clv is parallel-connected to the auxiliary module full bridge 38.

Figure 7:
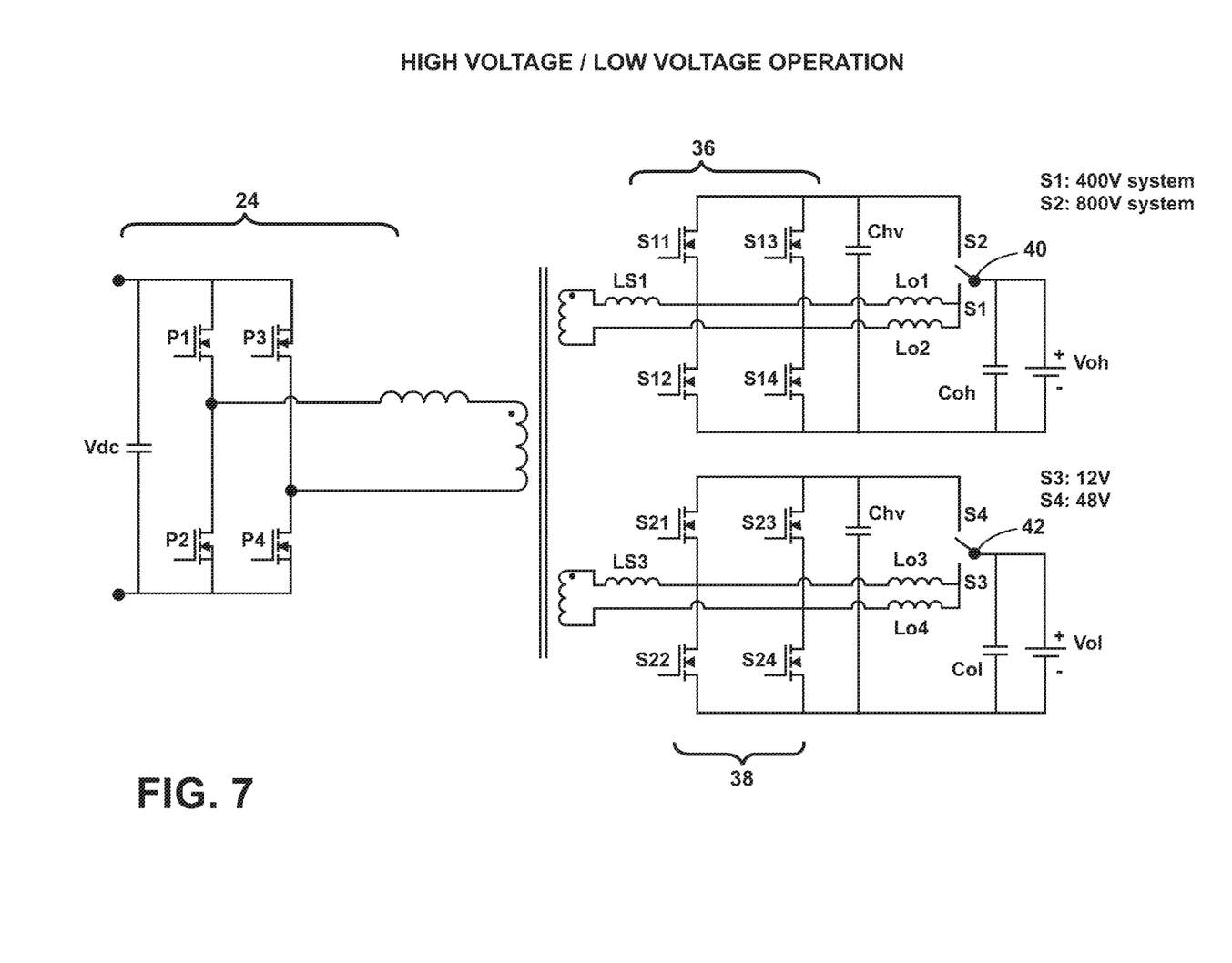
FIG. 7 is a circuit diagram of a power conversion system having a three-port module with two modes operation at each of a high voltage port and a low voltage port.
Figure 8:
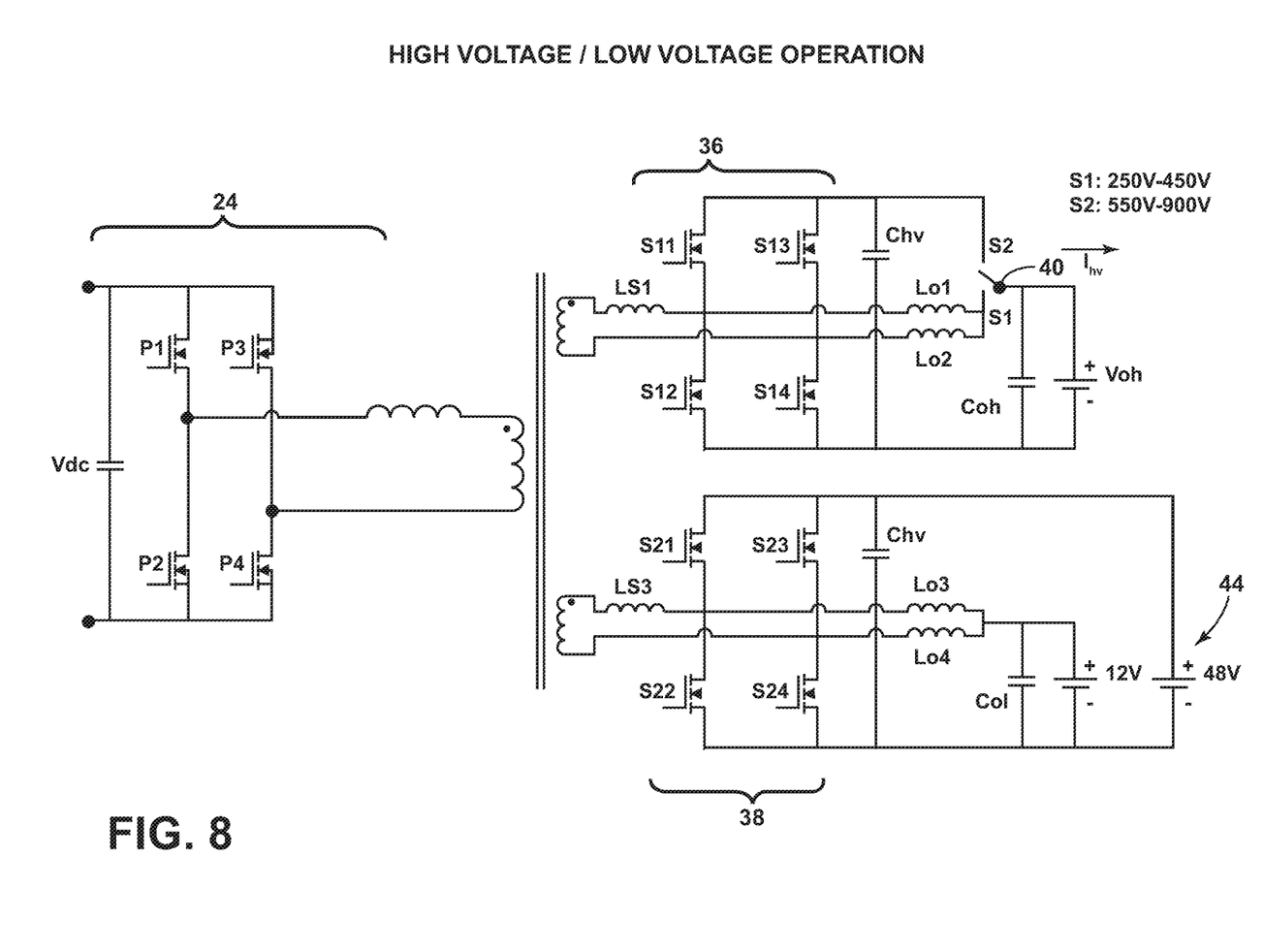
FIG. 8 is a circuit diagram of a power conversion system having a four-port module with two modes operation at a high voltage port and two low voltage ports.

As optionally shown in FIG. 7, the TPC module 14 can include a first switch 40 to provide multiple operating states to the first output and a second switch 42 to provide multiple operating states to the second output. For example, the first switch 40 can vary the first output port between 400V and 800V, and the second switch 42 can vary the second output port between 12V and 48V. More specifically, the first switch 40 is a double throw switch having a first position S1 and a second position S2. In the first position S1, the high voltage battery 18 is connected to a current-fed port (via the coupled inductors Lo1, Lo2). In the second position S2, the clamp capacitor Chv is directly connected to the high voltage battery 18, providing a voltage-fed port with a higher voltage and a lower current. In this position, the coupled inductors Lo1, Lo2 are parasitic loads, which can optionally be used to measure and correct for DC bias. Similarly, the second switch 42 is a double throw switch having a first position S3 and a second position S4. In the first position S3, the low voltage battery 20 is connected to a current-fed port (via the coupled inductors Lo3, Lo4). In the second position S4, the clamp capacitor Clv is directly connected to the low voltage battery 20, providing a voltage-fed port with a higher voltage and a lower current. As further shown in FIG. 8, the TPC module 14 includes an additional 48V port which operates simultaneously with the 12V port. In particular, the added port 44 is parallel connected to the low voltage clamp capacitor Clv, and is therefore voltage-fed while the existing 12V port is current-fed. The added port 44 is shown in combination with the low voltage full-bridge 38, however the added port 44 can instead be added to the high voltage full bridge 36, further optionally as an on-board charger or as an off-board charger to meeting different charging demands.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A power conversion system comprising:
a power factor correction module including a power factor correction rectifier, the power factor correction rectifier being adapted to convert a single-phase AC or a three-phase AC into a voltage regulated DC-bus voltage; and
a three-port converter module including a voltage-fed primary-side full bridge, a current-fed on-board charger full bridge, and a current-fed auxiliary power module full bridge, the three-port converter including a three-winding transformer having a first winding electrically connected to the primary-side full-bridge, a second winding electrically connected to the on-board charger full-bridge, and a third winding electrically connected to the auxiliary power module full-bridge, thereby forming a triple-active-bridge;
wherein the primary-side full bridge is electrically connected to the DC-bus voltage, the on-board charger full-bridge is adapted to convert an AC output of the second winding into a first DC voltage at a first output port, and the auxiliary power module full-bridge is adapted to convert an AC output of the third winding into a second DC voltage at a second output port, the first DC voltage being greater than the second DC voltage, the three-port converter module further including:
a first switch adapted to switch between a voltage-fed output and a current-fed output at the first output port, the first switch including a first input terminal, a second input terminal, and an output terminal, the output terminal being coupled to the first output port,
a first clamp capacitor that is parallel-connected to the first output port via the first input terminal when the first switch provides the voltage-fed output to the first output port, and
a first low-pass filter that is coupled to the first output port via the second input terminal when the first switch provides the current-fed output to the first output port, such that the three-port converter module comprises a dual output DC-DC converter that is operable to provide the first DC voltage to the first output port while simultaneously providing the second DC voltage to the second output port, the first DC voltage being either of the voltage-fed output or the current-fed output.

2. The power conversion system of claim 1 wherein the power factor correction rectifier includes a six-switch boost converter topology for rectification and power factor correction.

3. The power conversion system of claim 1 wherein the second winding and the third winding each comprise a tank circuit having a resonant inductor.

4. The power conversion system of claim 1 wherein the first low-pass filter comprises:
first and second smoothing inductors that are coupled to the second input terminal of the first switch, and
a filter capacitor connected in parallel with the first output port.

5. The power conversion system of claim 4 further including a second low-pass filter comprising third and fourth smoothing inductors and a further filter capacitor connected between the auxiliary power module full bridge and the second output port.

6. The power conversion system of claim 4 further including a low-voltage clamp capacitor that is parallel-connected to the auxiliary power module full bridge.

7. The power conversion system of claim 6 further including a second switch between the low-voltage clamp capacitor and the second output port, the second switch being adapted to switch between a voltage-fed output and a current-fed output at the second output port.

8. The power conversion system of claim 7 wherein the first switch and the second switch are double-throw switches.

9. The power conversion system of claim 1 wherein the second winding includes a turn ratio relative to the first winding that is different than the third winding.

10. The power conversion system of claim 1 wherein the auxiliary power module full-bridge is coupled to the second output port and a third output port, the second output port providing a DC output voltage greater than a DC output voltage provided by the third output port.

11. The power conversion system of claim 10 wherein the second output port is parallel connected to a second clamp capacitor that is coupled across an output of the auxiliary power module full-bridge.

12. The power conversion system of claim 11 wherein the third output port is parallel connected to a second low pass filter coupled across an output of the auxiliary power module full-bridge.

13. The power conversion system of claim 1 where the three-port converter module is adapted to simultaneously charge a high-voltage battery at the first output port and a low-voltage battery at the second output port.

14. A power conversion system comprising:
a converter module including a primary-side full bridge and an on-board charger full bridge, the converter including a transformer having a first winding electrically connected to the primary-side full-bridge and a second winding electrically connected to the on-board charger full-bridge;

wherein the primary-side full bridge is electrically connected to a DC-bus voltage, and wherein the on-board charger full-bridge is adapted to convert an AC output of the second winding into a DC voltage at an output port, the converter module further including:

a switch adapted to switch between a voltage-fed mode and a current-fed mode for providing a first voltage output and a second voltage output at the output port, the switch being a double-throw switch including a first input terminal, a second input terminal, and an output terminal, the output terminal being coupled to the output port, a clamp capacitor that is parallel-connected to the output port via the first input terminal when the first switch provides the voltage-fed output to the output port, a low-pass filter that is coupled to the output port via the second input terminal when the first switch provides the current-fed output to the first output port, such that the on-board charger full-bridge is operable to provide the DC voltage at the output port, the DC voltage being either of the voltage-fed output or the current-fed output.

15. The power conversion system of claim 14 wherein the first winding and the second winding each comprise a tank circuit having a resonant inductor.

16. The power conversion system of claim 14 wherein the low-pass filter comprises:

first and second smoothing inductors that are coupled to the second input terminal of the switch, and a filter capacitor connected in parallel with the output port.

* * * * *